United States Patent [19]

Benz

[11] 3,939,931
[45] Feb. 24, 1976

[54] ELECTRIC STARTER DRIVE FOR MOTOR ENGAGING VEHICLE DRIVE WHEEL

[75] Inventor: William G. Benz, San Jose, Calif.
[73] Assignee: Benz Vehicle Corporation, San Jose, Calif.
[22] Filed: Aug. 5, 1974
[21] Appl. No.: 494,665

[52] U.S. Cl............ 180/13; 123/179 SE; 180/33 D; 180/64 MM; 180/74; 180/DIG. 3
[51] Int. Cl.²......................................... B60K 17/30
[58] Field of Search ....... 180/12, 13, 33 D, 64 MM, 180/74, DIG. 3; 123/179 SE, 179 E, 179 M, 179 P; 280/242 WC, 289

[56] References Cited
UNITED STATES PATENTS

| | | | |
|---|---|---|---|
| 2,350,791 | 6/1944 | Mennesson | 180/74 X |
| 2,601,342 | 6/1952 | Starts | 180/33 D |
| 2,686,571 | 8/1954 | Horste | 180/74 |
| 2,710,659 | 6/1955 | Moederle | 180/DIG. 3 |
| 2,876,645 | 3/1959 | Schuh | 123/179 SE X |
| 2,927,571 | 3/1960 | Kamlukin | 123/179 SE |
| 3,841,428 | 10/1974 | Bialek | 180/74 |

Primary Examiner—M. Henson Wood, Jr.
Assistant Examiner—John P. Silverstrim
Attorney, Agent, or Firm—Limbach, Limbach & Sutton

[57] ABSTRACT

A mechanism for engaging an electric starter motor with the drive shaft of an engine which is pivotably mounted on a vehicle and movable into and out of engagement with a drive wheel. The starter motor is pivotably mounted both to the engine mount and the vehicle frame so that disengaging the engine from the drive wheel spaces the starter motor shaft further away from the drive shaft of the engine thereby tensioning a belt connected between the engine drive shaft and the starter motor shaft.

10 Claims, 4 Drawing Figures

ELECTRIC STARTER DRIVE FOR MOTOR ENGAGING VEHICLE DRIVE WHEEL

BACKGROUND OF THE INVENTION

The present invention relates to a powered unit which may be joined to a vehicle having an engine pivotally mounted for movement into and out of engagement with a vehicle driving wheel and more particularly to an electric starter motor drive for the engine of a motorized cycle.

Motorized cycles, either bicycles or tricycles, are known wherein an engine is provided with a drive shaft on which is mounted a friction wheel or wheels for engaging a driving wheel of the cycle. Typically, these engines are started with a pull rope or by engagement with the drive wheel, which is then moved. It is desirable to have these motors started with an electric starter. Such an electric starter is especially advantageous where the operator of the vehicle is handicapped, such as a paraplegic.

One of the most serious problems of the paraplegic or other nonambulatory person confined to a wheelchair is that of mobility. Wheelchairs provide a limited mobility which is determined by the ability of the person to propel and control the wheelchair by hand. Powered wheelchairs, which are extremely expensive as well as being heavy and cumbersome, provide a greater degree of mobility, but are still limited in terms of their stability, and particularly in terms of the speed at which they are capable of traveling. Such units, moreover, are relatively complex, requiring substantial maintenance, and are relatively uneconomical in terms of cost and range of operation. Furthermore, there are many occasions on which powered wheelchairs are disadvantageous as compared with nonpowered chairs. For example, a paraplegic who is capable of driving a car may be required to hold his own wheelchair and place it inside the car when he enters the car and to follow a reverse procedure when he leaves the car. A powered wheelchair has proven to be too large and heavy in such situations.

Accordingly, it has been found to be advantageous to provide a unit which may be coupled to a conventional nonpowered wheelchair to convert the wheelchair into a powered vehicle and which may be uncoupled from the wheelchair to permit normal use of the wheelchair when desired. Such a powered unit is described in detail in a co-pending application entitled WHEELCHAIR-ATTACHABLE POWERED UNIT, filed Nov. 26, 1973, and issued as U.S. Pat. No. 3,912,032, on Oct. 14, 1975, of which the present applicant is a coinventor. The unit described therein basically comprises a frame structure and a pivotable or steerable wheel rotatably mounted on a fork assembly which is in turn pivotably mounted within a cylindrical member forming a part of the frame structure. Handlebars are coupled to the fork assembly within the cylindrical member. An engine is pivotably mounted on the fork assembly and is pivotable between a position clear of the wheel and a driving position in which the engine drive shaft frictionally engages the wheels.

The frame assembly includes means for supporting the powered unit in an upright position when detached from a wheelchair and is readily couplable to the frame of a conventional wheelchair which has been appropriately modified to form a powered, three-wheeled vehicle.

One problem is using such a frictional drive arrangement in a powered wheelchair unit is in providing a simple and reliable mechanism for starting the engine. While it is possible to start the engine by engaging it with the driving wheel and then accelerating the vehicle to a low speed, this obviously could be done only with some difficulty by a handicapped driver. A rope or windup starter could be used to start the engine while it is disengaged from the driving wheel, but again these procedures may require more strength than the driver possesses. Furthermore, the engine cannot be started while its drive shaft is in engagement with the driving wheel unless the vehicle is moving and the starter motor must not be engaged with the engine shaft while the engine shaft is engaged with the wheel since this would ultimately burn out the starter motor.

SUMMARY OF THE INVENTION

The above and other problems are overcome by the present invention of an electric starter unit for an engine mounted for driving a wheel of a vehicle comprising a frame for rotatably mounting the driven wheel, an engine having a drive shaft, a pulley mounted on the drive shaft and means for pivotably mounting the engine on the frame so that the drive shaft is selectively engageable with the driven wheel. An electric starter motor having a drive shaft is pivotably attached at one position to the engine and at another portion to the frame so that the starter motor drive shaft is moveable from a first position relatively close to the engine pulley when the engine is engaged with the driven wheel and a second position further away from the engine pulley when the engine is not driving the wheel. A belt connecting the starter motor drive shaft and the pulley is thereby pulled taut when the engine is disengaged from the driven wheel.

It is therefore an object of the present invention to provide an electric starter for the engine of a powered wheelchair;

It is another object of the invention to provide a simple and reliable electric starter for the engine of a friction drive, powered vehicle; and It is still a further object of the invention to provide an electric starter for a wheel mounted engine of a powered vehicle wherein the starter is engaged with the engine only when the engine is disengaged from the driving wheel of the wheelchair.

The foregoing and other objectives, features and advantages of the invention will be more readily understood upon consideration of the following detailed description of certain preferred embodiments of the invention, taken in conjunction with the accompanying drawings.

DETAILED DESCRIPTION OF THE PREFERRED EMBODIMENT

Figure 1:
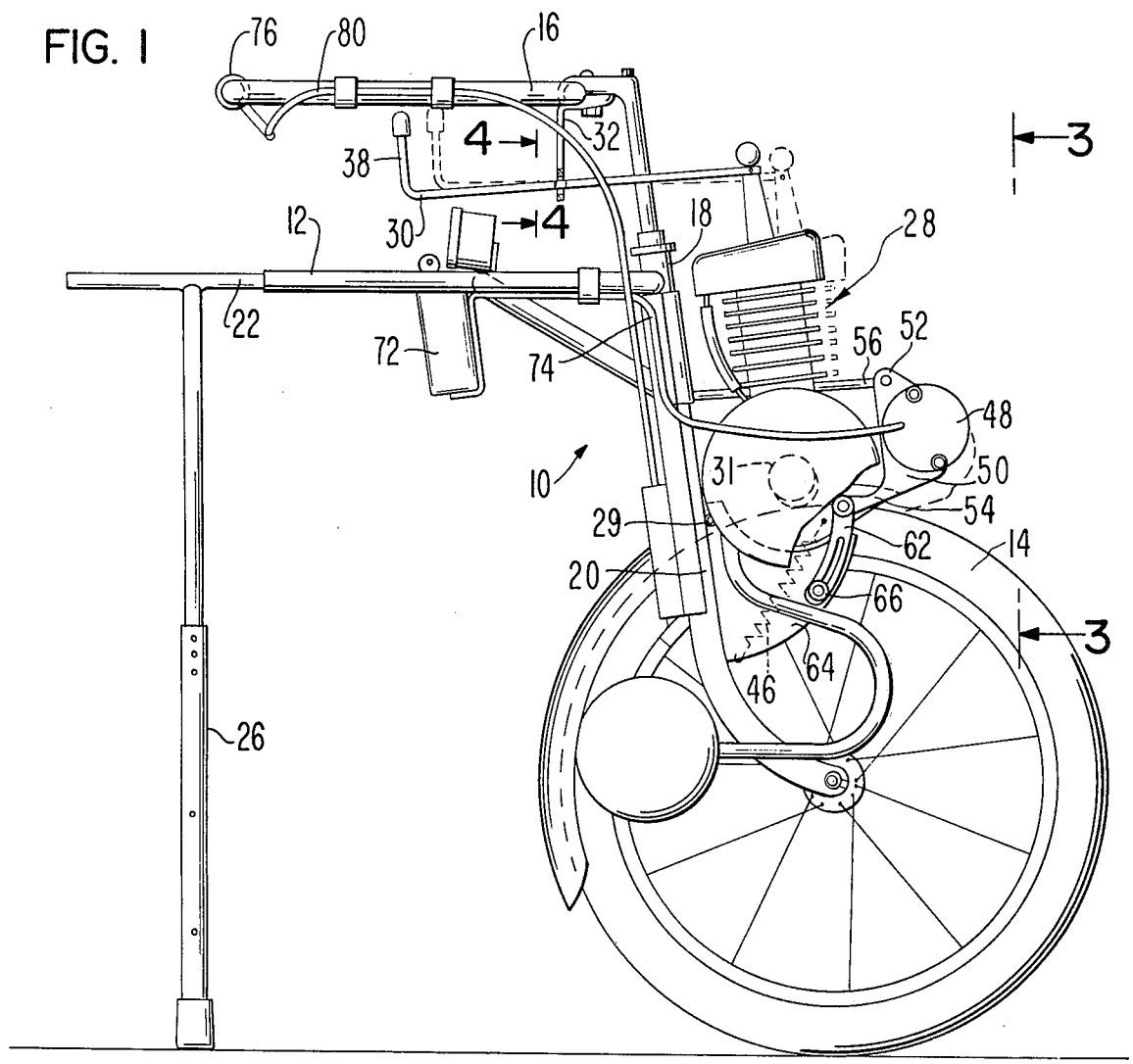
FIG. 1 is a side view in elevation of a powered unit in accordance with the invention.
Figure 4:
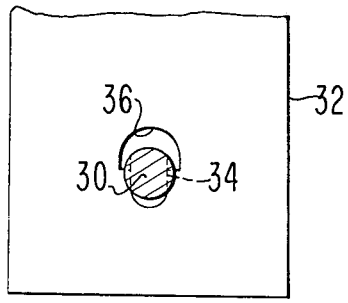
FIG. 4 is a vertical view, in section, taken generally along the line 4—4 of FIG. 1.
Figure 2:
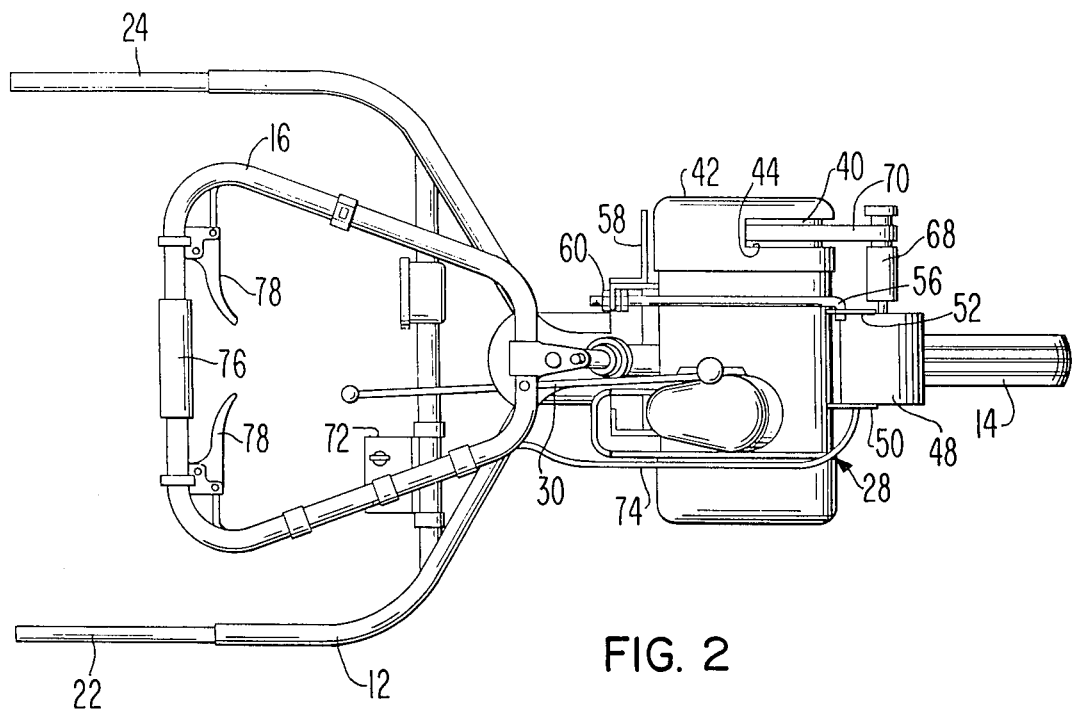
FIG. 2 is a top view of the powered unit of FIG. 1.
Figure 3:
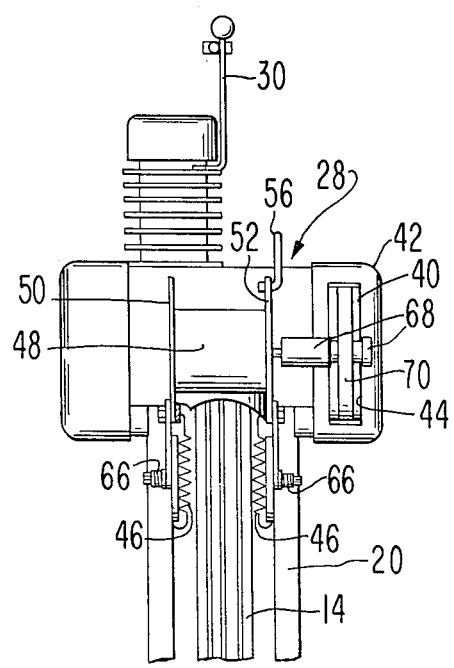
FIG. 3 is a front view of the powered unit of FIG. 1 with portions broken away.

The various figures of the drawing illustrate a powered unit 10 according to the invention. The powered unit 10 has a frame 12, a front wheel 14 pivotably mounted on the frame 12, and a handlebar assembly 16 coupled to the wheel 14 through the frame 12 to permit pivoting movement of the wheel 14 by hand relative to the frame 12.

The frame 12 includes a hollow, generally cylindrical member 18 of the type used in bicycles which receives a fork assembly 20 in which the front wheel 14, also of conventional bicycle design, is rotatably mounted. The handlebar assembly 16 extends through the top end of the cylindrical member where it is coupled to the fork assembly 20. A pair of elongated, tubular members 22 and 24 which comprise part of the frame structure 12 extend rearwardly from the cylindrical member 18 in parallel directions away from the front wheel 14. A pair of support legs 26 are coupled to the tubular members 22 and 24 respectively so as to extend downwardly therefrom. When the powered unit 10 is detached from the wheelchair the lower ends of the support legs 26 rest on the ground so as to support the powered unit 10 in an upright position together with the front wheel 14. A front wheel frictional drive motor assembly 28 is mounted just in front of the cylindrical member 18 and over the front wheel 14 to selectively engage and drive the front wheel 14.

The front wheel frictional drive motor assembly 28 may be of any appropriate size and configuration, but preferably is of the type sold under the trademark "SOLEX" by Solex Company of Paris, France. The Solex unit is ideally suited for this type of application since it utilizes a relatively small gasoline engine which requires relatively little torque to start and which is economical to operate. Because of engine's economy, only a small gas tank is required. The Solex unit also includes a small generator which may be used to power lights and other accessories for the vehicle. The power produced by the Solex unit is relatively low compared to that of other vehicles, and yet is adequate for vehicles in accordance with the invention.

The engine 28 is pivotably mounted by a bracket 29 to the fork assembly 20 so that the engine can tilt into and out of frictional engagement with the wheel 14 as shown in hidden line fashion in FIG. 1. A control rod 30 is pivotably attached at one end to the top of the engine 28. The rod 30 is slidably mounted in a flat vertical bracket 32 which is attached to the handlebar 16. The rod 30 has a notch 34 which engages in a keyhole shaped slot 36 in the flat bracket 32 when the engine 28 is tilted up, off of the wheel 14. The end of the control rod 30 furthest from the engine 28 is provided with a hand grip 38. A pair of springs 46 are connected between the engine 28 and the fork assembly 20 to urge the engine shaft 31 against the wheel 14 when the engine is in the down position. A flywheel/pulley 40 is mounted on the drive shaft 31 and is enclosed in a housing 42. A slot 44 in the front of the housing 42 allows access to the pulley 40.

An electric starter motor 48 is rigidly mounted between a pair of brackets 50, each one having upper protruding tabs 52 and lower protruding legs 54. The starter motor 48 is positioned over the wheel 14 and directly in front of the engine 28. One of the tabs 52 has a hole in which one end of a tension adjustment rod 56 is pivotably attached. The other end of the rod 56 is threaded and adjustably mounted in a bracket 58 by means of nuts 60 threaded onto the end of the rod 56. The bracket 58 is attached to the fork assembly 20.

The legs 54 of the starter motor bracket 50 extend rearwardly and beneath the engine 28 and are pivotably mounted to the bottom of the engine frame. A pair of slotted, arcuately shaped straps 62 are connected between each of the pivot points of the legs 54 and one of a pair of support brackets 64 attached to the fork assembly 20. A bolt 66 is passed through each bracket 64 and the slot of each strap 62 and a nut is fastened on the end of the bolt to limit the extremes of the upward and downward positions of the engine 28.

The starter motor 48 has a circumferentially grooved drive shaft 68. A belt 70 is fitted over the grooved starter drive shaft 68 and the engine pulley 40. When the engine is tilted upwardly off of the wheel 14 by means of the rod 30, the leg 54 is also moved upwardly and forwardly of the engine 28. Because the tabs 52 of the starter brackets 50 are prevented from moving forwardly by the tension adjustment rod 56, the starter motor 48 and the support brackets 50 are pivoted counterclockwise about the point where the rod 56 joins the tab 52, as viewed in FIG. 1. The result of this movement is to displace the starter drive shaft 68 further away from the engine pulley 40 and to thus pull the belt 70 tight between the two.

A rechargable battery and key operated switch unit 72 is mounted on the frame 12 and is connected to supply electric power to the starter motor 48 by means of a multi-conductor cable 74. After the engine 28 is tilted up to disengage it from the wheel 14 and to engage the engine pulley 40 with the starter drive shaft 68 through the belt 70, the vehicle operator may turn on the starter motor 48 and start the engine 28. When the operator lowers the running engine 28 on the wheel 14 by means of the rod 30 the starter motor 48 is pivoted downwardly and slightly clockwise to the position indicated in hidden line fashion in FIG. 1. Since the starter shaft 68 and the pulley 40 are thereby moved closer to each other in this position the belt 70 is slackened and the starter motor 48 is disengaged from the engine 28.

The handlebar assembly 16 comprises a closed, generally oval-shaped loop. It has been found that this particular configuration is easier to handle than the more conventional bicycle handlebar configuration. In particular, the closed loop handlebar configuration allows the occupant of the wheelchair to exercise complete control over the vehicle with one hand while sitting comfortably in the wheelchair. This is made possible, in part, by the location of a speed control 76 and handbrake controls 78 within close proximity of one another of the handlebar assembly 16. With this particular arrangement the speed control 76 may be selectively adjusted to propel the vehicle forward at an optimum speed. The speed control 76 is coupled by a cable 80 to the motor 28. The handbrake controls 78 are coupled by a cable (not shown) to conventional bicycle caliper brakes (not shown) mounted on the fork assembly 20.

The controls 76 and 78 are located close to one another so as to be simultaneously operable by the occupant of the wheelchair. At the same time the occupant's hand rests on the handlebar assembly 16 to effect more than adequate steering control under all but the most demanding of situations.

While the invention has been described above with particular reference to a powered wheelchair it should be apparent that in other embodiments it may be utilized in conjunction with other, similar vehicles, such as two and three wheeled bicycles, for example.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. An electric starter unit for an engine having a drive shaft and mounted for driving a wheel of a vehicle, comprising a frame for rotatably mounting the driven wheel, a pulley mounted on the drive shaft, means for pivotably mounting the engine on the frame so that the drive shaft is selectively engageable with the driven wheel, electric starter means including a starter motor having a drive shaft, a belt connecting the starter motor drive shaft and the pulley, means for pivotably attaching one portion of the starter motor to the engine and another portion of the starter motor to the frame so that the starter motor drive shaft is movable from a first position relatively close to the engine pulley when the engine is engaged with the driven wheel and a second position further away from the engine pulley, thereby pulling the belt taut, when the engine is disengaged from the driven wheel.

2. A power attachment for use with a vehicle comprising:
   a frame adapted to be selectively coupled to the vehicle;
   a wheel pivotably mounted on the frame;
   steering means coupled to the wheel and being hand operable to pivot the wheel relative to the frame;
   motor means having a drive shaft and pivotably mounted on the frame with the drive shaft being selectively engageable with the wheel when the motor means is tilted from a first position to a second position;
   a pulley on the motor drive shaft;
   starter means including a starter motor having a drive shaft;
   a driving belt extending around both the pulley and the starter drive shaft; and
   means for mounting the starter motor, including means for pivotably attaching it to the frame and to the motor means so that the starter drive shaft is moved closer to the motor drive shaft when the motor means is moved from the first position to the second position.

3. A vehicle power attachment as recited in claim 2, further including at least one support member coupled to the frame and operative to support the power attachment in an upright position when the frame is not coupled to the vehicle.

4. A power attachment as recited in claim 2, wherein the frame includes a hollow cylindrical member, a fork assembly partly mounted within the cylindrical member for pivoting movement relative to the frame and having the wheel rotatably mounted thereto, the steering means being partly mounted within the cylindrical member and coupled to the fork assembly, and wherein the motor means is mounted to the frame in the region of the cylindrical member and has the motor drive shaft selectively, frictionally engageable with the wheel to drive the wheel.

5. A power attachment for use with a vehicle comprising:
   a frame adapted to be selectively coupled to the vehicle;
   a wheel pivotably mounted on the frame;
   steering means coupled to the wheel and being hand operable to pivot the wheel relative to the frame;
   motor means having a drive shaft and pivotably mounted on the frame with the drive shaft being selectively engageable with the wheel when the motor means is tilted from a first position to a second position;
   a pulley on the motor drive shaft;
   starter means, including a starter motor having a drive shaft;
   a driving belt extending around both the pulley and the starter drive shaft; and
   means for connecting the starter motor to the frame in a position such that the starter drive shaft is closer to the motor drive shaft when the motor means is moved from the first position to the second position, thereby slackening the driving belt and dispensing the starter motor shaft from the motor drive shaft.

6. An electric starter unit for an engine having a drive shaft and mounted for driving a wheel of a wheelchair vehicle, comprising a frame for rotatably mounting the driven wheel, a pulley mounted on the drive shaft, means for pivotably mounting the engine of the frame so that the drive shaft is selectively engageable with the driven wheel, electric starter means including a starter motor having a drive shaft, a belt connecting the starter motor drive shaft and the pulley, means for pivotably attaching one portion of the starter motor to the engine and another portion of the starter motor to the frame so that the starter motor drive shaft is movable from a first position relatively close to the engine pulley when the engine is engaged with the driven wheel and a second position further away from the engine pulley, thereby pulling the belt taut, when the engine is disengaged from the driven wheel.

7. A power attachment for use with a wheelchair comprising:
   a frame adapted to be selectively coupled to a wheelchair;
   a wheel pivotably mounted on the frame;
   steering means coupled to the wheel and being hand operable to pivot the wheel relative to the frame;
   motor means having a drive shaft and pivotably mounted on the frame with the drive shaft being selectively engageable with the wheel when the motor means is tilted from a first position to a second position;
   a pulley on the motor drive shaft;
   starter means, including a starter motor having a drive shaft;
   a driving belt extending around both the pulley and the starter drive shaft; and
   means for mounting the starter motor, including means for pivotably attaching it to the frame and to the motor means so that the starter drive shaft is moved closer to the motor drive shaft when the motor means is moved from the first position to the second position.

8. A wheelchair power attachment as recited in claim 7, further including at least one support member coupled to the frame and operative to support the power attachment in an upright position when the frame is not coupled to a wheelchair.

9. A wheelchair power attachment as recited in claim 7, wherein the frame includes a hollow cylindrical member, a fork assembly partly mounted within the cylindrical member for pivoting movement relative to the frame and having the wheel rotatably mounted thereto, the steering means being partly mounted within the cylindrical member and coupled to the fork assembly, and wherein the motor means is mounted to the frame in the region of the cylindrical member and has the motor drive shaft selectively, frictionally engageable with the wheel to drive the wheel.

10. A power attachment for use with a wheelchair comprising:
- a frame adapted to be selectively coupled to a wheelchair;
- a wheel pivotably mounted on the frame;
- steering means coupled to the wheel and being hand operable to pivot the wheel relative to the frame;
- motor means having a drive shaft and pivotably mounted on the frame with the drive shaft being selectively engageable with the wheel when the motor means is tilted from a first position to a second position;
- a pulley on the motor drive shaft;
- starter means, including a starter motor having a drive shaft;
- a driving belt extending around both the pulley and the starter drive shaft; and
- means for connecting the starter motor to the frame in a position such that the starter drive shaft is closer to the motor drive shaft when the motor means is moved from the first position to the second position, thereby slackening the driving belt and disengaging the starter motor shaft from the motor drive shaft.

* * * * *